Dec. 16, 1930.　　　　T. B. BUFFUM　　　　1,785,690
APPARATUS FOR AND METHOD OF TESTING CORDS
Filed March 29, 1923

INVENTOR
THOMAS B. BUFFUM
BY
ATTORNEY

Patented Dec. 16, 1930

1,785,690

UNITED STATES PATENT OFFICE

THOMAS B. BUFFUM, OF AKRON, OHIO, ASSIGNOR TO THE GOODYEAR TIRE & RUBBER COMPANY, OF AKRON, OHIO, A CORPORATION OF OHIO

APPARATUS FOR AND METHOD OF TESTING CORDS

Application filed March 29, 1923. Serial No. 628,611.

My invention relates to a machine for and a method of testing cords, such as are utilized in the construction of pneumatic tire carcasses, and it has, for its primary object, the provision of a machine of the above designated character, which may be employed to approximately establish conditions of test that the cords are subjected to in a tire during its operation.

The majority of pneumatic tires now manufactured are of the type generally called "cord tires", which embody cord fabric. The cords embodied in such fabric are, of course, made from materials which are not uniform and, consequently, it is desirable to provide a test whereby the cords may be tested for durability under conditions approximately those attending their use. The primary object of this invention resides in testing cords in such manner as to indicate their qualities and whether they possess the desired characteristics necessary for service in pneumatic tires.

The various objects and advantages of my invention will be apparent from the following description read in conjunction with the accompanying drawings.

Figure 1:
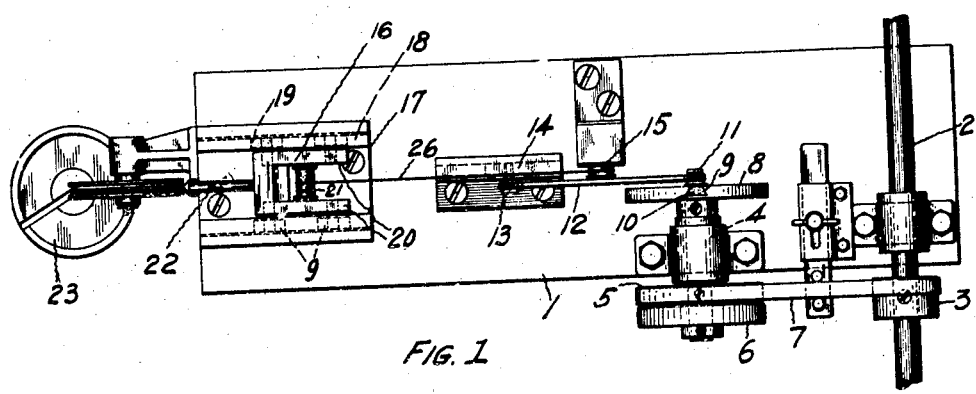
Fig. 1 is a plan view of apparatus constructed in accordance with my invention that is adapted to test the durability of cords.

In practicing my invention a machine may be provided for testing cords by mounting a pulley upon a supporting-plate, to which is suitably connected a slidably mounted member provided with a plurality of hooks or other fastening means to which the ends of a cord may be attached. A roller bearing is disposed in proximity to the slidable member, and another reciprocable member is mounted upon the plate, which is provided with a highly polished roller bearing. Means may be provided for attaching a weight to the last mentioned reciprocable member. A cord may be mounted upon the roller bearings and attached to the slidable member whereby movement of the slidable member imparts movement to the cord, thus flexing it in somewhat the same manner as occurs when such a cord is embodied in a pneumatic tire. The weight, being attached to the reciprocable member, imposes a constant load upon the cord to effect a tensioning thereof.

A better understanding of my invention may be had by reference to the accompanying drawings in which is shown a testing device comprising a supporting-plate 1, upon one end of which is mounted a drive shaft 2 having drive pulleys 3 secured thereto. An auxiliary drive shaft 4 is mounted upon the plate 1 and has a pulley 5 rigidly secured upon one end thereof in contiguous relation to an idler pulley 6. A belt 7 is trained over the drive pulley 3 and either the idler pulley 6 or the drive pulley 5, depending upon whether the machine is being operated. A driven disc 8 is mounted upon the other end of the shaft 4 and is provided with a central slot 9, having angular walls, into which is fitted an elongate bar 10 carrying a crank pin 11. A connecting rod 12 is secured to the crank pin 11 and to a stud 13 mounted upon a slidable member 14, which is also mounted upon the plate 1. A member 15 is rotatably mounted upon the plate 1 and is preferably formed of hardened metal provided with a highly polished surface to reduce the possibility of friction, as will be hereinafter explained.

A reciprocable member 16 is mounted upon the plate 1 and comprises a supporting base 17 provided with a plurality of channels 18 adapted to receive roller bearings 19, to which a plurality of bars 20 are secured. A cylindrical member 21 is rotatably mounted between the bars 20 and is formed of hardened steel provided with a highly polished surface so that it resembles a roller bearing. A pin 22 is secured to the movable bars 20 to provide for attaching a weight 23 thereto by means of a cable 24 passed over a pulley 25 mounted upon the end of the plate 1.

In operating the machine or device above described, a test cord 26 is trained about the the roller bearings or rotatable members 15 and 21, and secured to pins upon the member 14. It will be appreciated that the cord is thus held in a definite position and prevented from rotating when given a reciprocable movement or a movement in the direction of its longitudinal axis. The drive shaft 2 may be continuously operated and the remaining portions of the device maintained stationary by training the belt 7 over the idler pulley 6. When it is desired to begin a test, the belt is then moved to the drive pulley 5, which, consequently, drives the disc 8, thereby effecting a reciprocable movement of the member 14. The extent of this movement is controlled by the position of the bar 10 and the crank pin 11, because, obviously, the throw of the crank arm depends upon the eccentricity of its mounting.

As the member 14 is moved to and fro upon its mounting the cord will be moved over the members 21 and 15, while the weight 23 constantly imposes a load thereupon regardless of the amount of stretch that results in the cord. It should be noted that the rotatable member 15 is of somewhat greater diameter than the member 21, and, consequently, the flexing action of the cord 26, resulting from its movement over the rotatable members, is greater adjacent the member 21 than the member 15. Consequently, breakage always occurs in the cord near the member 21 rather than its cooperating member 15. The continued and periodical flexing of the cord, which is under tension resulting from the imposition of the weight 23 thereupon, very closely approximates conditions that exist in a tire carcass because the cords are continually flexed and subjected to tension due to the load imposed thereupon. Moreover, there is practically no wear as a result of friction because of the nature of the rotatable members 15 and 21.

Figure 2:
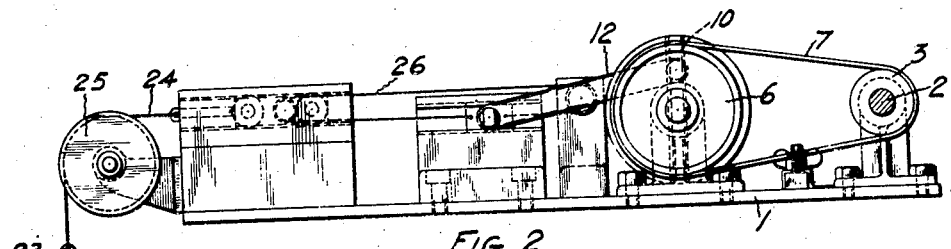
Fig. 2 is a side elevational view of the apparatus shown in Fig. 1.

It will be obvious that a number of units, such as shown in Figs. 1 and 2, may be mounted in alignment to facilitate concurrent tests of a number of cords. However, the unit described and shown in Figs. 1 and 2 constitutes an embodiment of the invention. It will be observed, furthermore, that the supporting plates may be mounted in an upright position, and in such application of the machine, the weight 23 will, of course, be suspended in a direct line therefrom. However, such minor features of the construction and application of the machine do not alter the principle involved in its construction and adaptation.

Figure 3:
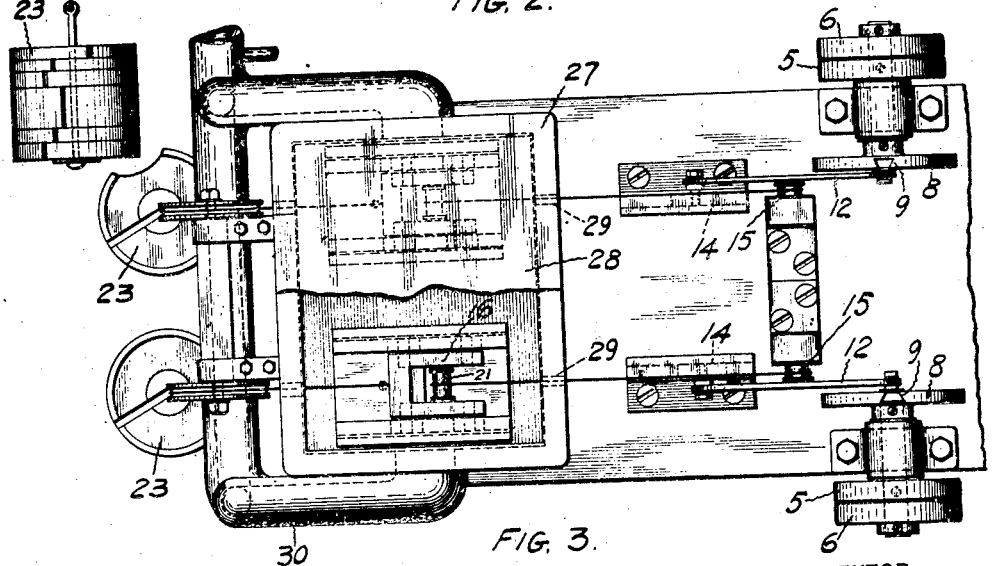
Fig. 3 is a plan view of apparatus similar to that shown in Fig. 1 with the addition of a heating device adapted to apply heat to the cords under test.

In Fig. 3 is shown a plurality of units, such as shown in Figs. 1 and 2, but with the addition of a heating device comprising a chamber 27. The chamber 27 is provided with a cover 28 and a plurality of openings 29 through which the cords being tested may be inserted. As will be seen from the drawings, the chamber 27 encloses the reciprocable member 21 in order that heat may be supplied to that portion of the cord which is subjected to the breakage test. Suitable conduits 30 are connected to a source of heat supply, not shown. The addition of the heating device to the apparatus provides for maintaining the cords under test at a temperature approximating the temperature attained in a pneumatic tire when being continuously driven under the application of a load. With the addition of the heating device, a very close approximation of the conditions existing in a pneumatic tire are established, and, consequently, comparative tests may be run upon various cords to determine their ability to withstand the stresses imposed upon them in a tire carcass. It has been found by testing a certain type of cords and subsequently embodying cords of this type in a tire, that very close comparisons may be made for determining the value of the material.

Although I have shown and described apparatus that may be constructed in accordance with my invention and set forth a method of testing cords by the operation of such apparatus, it is obvious that many changes may be made in the construction of the apparatus and in the method of utilizing it without departing from the spirit or scope of my invention, and I desire, therefore, that no limitations shall be imposed, except such as are indicated in the appended claims.

What I claim is:

1. A cord testing device comprising means for imposing a load upon and for securing a cord against rotative movement about its own axis, including members about which the cord is looped, said means also including a member connecting the ends of the cord adjacent each other, and means acting upon the last named member for flexing the cord.

2. A cord testing device comprising means for imposing a load upon and for securing a cord against rotative movement about its own axis, including a reciprocable member securing the ends of the cord adjacent each other, and means associated with the reciprocable member for flexing the cord.

3. A cord testing device comprising a reciprocable member, means for securing the ends of a cord thereto, a plurality of rotatable members around which the cord may be looped, means for reciprocating the first member, and means for imposing a constant load upon the cord.

4. A cord testing device comprising a reciprocable member, means for securing the ends of a cord thereto, a plurality of rotatable members of unequal size about which the cord may be trained, means for reciprocating the first member, and means for imposing a constant load upon the cord.

5. A cord testing device comprising a reciprocable member, means for securing the ends of a cord thereto, a plurality of rotatable members of unequal size one of which is mounted upon a slidable support, means for reciprocating the first member, and means for securing a load upon the slidable support.

6. A cord testing device comprising means for flexing a cord, means surrounding the cord for applying heat thereto, and means for imposing a constant load upon the cord.

7. A cord testing device comprising a reciprocable member, means for varying the degree of movement of the member, a plurality of rotatable members of unequal size about which a cord may be trained, means for securing the ends of the cord to the first member, means for effecting a reciprocating movement of the first member, and means for imposing a constant load upon the cord.

8. A method of testing cords that comprises securing a cord about a plurality of members to form a loop, connecting the ends of the cord adjacent each other, imposing a constant load upon the cord and alternately moving the cord in opposite directions about the members until it breaks.

9. A method of testing cords that comprises securing a cord in a substantially continuous loop about two separated revoluble spools, connecting its ends to a reciprocating member, imposing a constant load upon the cord through one of the spools, and alternately moving the cord in opposite directions about the spools by reciprocating the member until the cord breaks.

In witness whereof, I have hereunto signed my name.

THOMAS B. BUFFUM.